United States Patent [19]
Noguchi et al.

[11] Patent Number: 5,876,824
[45] Date of Patent: Mar. 2, 1999

[54] MAGNETIC RECORDING DISK AND MAGNETIC RECORDING AND REPRODUCING METHOD

[75] Inventors: Hitoshi Noguchi; Shinji Saitoh, both of Kanagawa, Japan

[73] Assignee: Fuji Photo Film Co., Ltd., Kanagawa, Japan

[21] Appl. No.: 872,371

[22] Filed: Jun. 10, 1997

[30] Foreign Application Priority Data

Jun. 10, 1996 [JP] Japan ..................................... 8-171714

[51] Int. Cl.⁶ ....................................................... G11B 5/70
[52] U.S. Cl. ........................ 428/65.3; 428/65.4; 428/65.6; 428/141; 428/216; 428/323; 428/328; 428/694 BR; 428/694 BA; 428/900
[58] Field of Search .................................. 428/65.3, 65.4, 428/65.6, 141, 216, 323, 328, 694 BR, 694 BA, 900

[56] References Cited

U.S. PATENT DOCUMENTS 5,455,093  10/1995  Kawamata et al. ..................... 428/65.3
5,458,948  10/1995  Yanagita et al. ......................... 428/141

*Primary Examiner*—Stevan A. Resan
*Attorney, Agent, or Firm*—Sughrue, Mion, Zinn, Macpeak & Seas, PLLC

[57] ABSTRACT

A magnetic recording disk favorably employable in a magnetic recording and reproducing method in which a magnetic recording disk is rotated at an increased rotation rate is essentially composed of a flexible support, a non-magnetic undercoating layer, and a thin magnetic layer which has a smooth surface and utilizes an iron-containing ferromagnetic metal powder, wherein the ferromagnetic metal powder contains an amount of an aluminum element in an amount of 5 to 30 atomic % based on the amount of iron element, and the magnetic layer is adjusted to have a squareness ratio of in the range of 0.15 to 0.30.

14 Claims, No Drawings

MAGNETIC RECORDING DISK AND MAGNETIC RECORDING AND REPRODUCING METHOD

FIELD OF THE INVENTION

The present invention relates to a magnetic recording disk which is favorably employable for high density recording and has very high running durability, and to a magnetic recording and reproducing method employing the said magnetic recording disk. Particularly, the invention relates to an improvement of a magnetic recording disk comprising a flexible non-magnetic support, a non-magnetic layer having a non-magnetic powder dispersed therein, and a magnetic layer having a ferromagnetic iron powder dispersed therein which is superposed on the non-magnetic layer, and further relates to a magnetic recording and reproducing method employing the magnetic recording disk.

BACKGROUND OF THE INVENTION

Magnetic recording disks such as floppy disks have been widely employed as external storage devices, with the spread of various office automation apparatuses such as word processors and personal computers. The floppy disk is composed of a flexible non-magnetic support (such as a support of plastic material) and a magnetic layer comprising a ferromagnetic powder such as a ferrite powder.

The magnetic recording disk can be produced by coating a magnetic paint for forming a magnetic layer comprising a ferromagnetic powder, a binder and an organic solvent continuously on a support and drying the coated magnetic paint layer. The coated magnetic layer ought to contain auxiliary materials such as an electroconductive powder, a lubricant and a abrasive powder so as to impart high performance to the magnetic layer, for instance, to increase its abrasion resistance to a practically satisfactory level and/or reduce its surface electric resistance.

The incorporation of the auxiliary materials into the magnetic layer results in decrease of the amount of the magnetic powder, increase of the thickness of the magnetic layer (e.g., 3 to 6 $\mu$m), an production of so-called thickness loss such as reduction of output. It is known that the thickness loss can be effectively reduced by decreasing the thickness of the magnetic layer. It is also known that the reduced thickness of the magnetic layer further results in increase of recording density. However, if the thickness of the magnetic layer is reduced, it is difficult to incorporate an enough amount of the auxiliary materials into the magnetic layer. In that case, the surface electric resistance of the magnetic layer is apt to be higher and the endurance decreases. Particularly, if the thickness of the magnetic layer decreases to 2 $\mu$m or less, the surface of the magnetic layer is easily influenced by the roughness of the surface of the support whereby the running property deteriorates and the electromagnetic conversion property lowers.

Japanese patent Provisional Publications No. 62-154225 and No. 62-222427 describe a magnetic recording disk having a thinner magnetic layer (0.3 to 1 $\mu$m) and a thick non-magnetic undercoating layer which is thicker than the magnetic layer and is provided between the support and the thin magnetic layer. Thus produced magnetic recording disk shows improved electromagnetic conversion characteristics as well as improved running endurance.

Japanese Patent Provisional Publications No. 63-191315, No. H4-325917, No. H5-109061 and No. H6-68453 describe a process for preparing the magnetic recording disk which comprises the steps of: coating on a support a coating dispersion for the non-magnetic layer which contains a non-magnetic powder dispersed in a binder resin solution to form a non-magnetic layer; coating a magnetic paint (i.e., coating dispersion for the magnetic layer which contains a magnetic powder dispersed in a binder resin solution) on the non-magnetic layer while the non-magnetic layer is still wet; and then drying these layers simultaneously. This process enables formation of an extremely thin magnetic layer with little influence of the conditions of the non-magnetic layer. Therefore, the resulting magnetic layer has satisfactory surface smoothness and shows improvement of the electromagnetic conversion property. The above Patent Provisional Publications further describe the incorporation of a lubricant and carbon black (i.e., electroconductive particles) in combination into both layers, i.e., the non-magnetic undercoating layer and the magnetic layer of the magnetic recording disk, so as to further improve the electromagnetic conversion characteristics, anti-static property, and running endurance. Further, description is given for the non-magnetic powder employed for the preparation of the non-magnetic undercoating layer of 0.5 to 5 $\mu$m thick.

Requirements for increase of the recording capacity and reduction of the disk size are getting stronger. Therefore, the magnetic recording disk now should ensure, or further improve, high performances on the reproduction output, and running endurance, notwithstanding the requirements for the high recording capacity by the employment of the thinner magnetic layer. However, the thinner magnetic layer such as of not thicker than 0.5 $\mu$m likely becomes to lower in its running durability, because the magnetic recording layer of the recording disk is rotated at a high speed in contact with a magnetic head and other members of the disk cartridge. Such rotation of a high speed is necessarily employed to ensure the desired high recording density.

It has been known that incorporation of an aluminum element into a ferromagnetic iron powder is effective to enhance electromagnetic conversion characteristics and running durability. For instance, Japanese Patent Provisional Publication No. H6-215360 describes a magnetic recording medium having a magnetic layer containing a ferromagnetic iron powder which comprises 100 weight parts of an iron atom, 2 to 10 weight parts of an aluminum atom, and 1 to 8 weight parts of a rare earth element atom.

SUMMARY OF THE INVENTION

The present invention has an object to provide a magnetic recording disk which can store digital signals at an increased density, give electromagnetic conversion characteristics for digital signals, and show enhanced running durability capable of coping with repeated rotation at a high rotation rate.

The present invention resides in a magnetic recording disk comprising a flexible non-magnetic support, a non-magnetic undercoating layer which is arranged on at least one surface of the support and comprises a non-magnetic inorganic powder and a lubricant dispersed in a binder, and a magnetic layer which has a thickness of 0.05 to 0.5 $\mu$m, has a center line average roughness at a cut-off value of 0.25 mm of not more than 0.03 $\mu$m, and comprises a ferromagnetic metal powder and a lubricant dispersed in a binder, wherein the ferromagnetic metal powder comprises an iron element and an aluminum element, the latter being in an amount of 5 to 30 atomic %, preferably 11 to 20 atomic %, more preferably 11 to 18 atomic %, based on the amount of iron element; and the magnetic layer is adjusted to have a squareness ratio in the direction vertical to the plane of the magnetic layer in the range of 0.15 to 0.30.

DETAILED DESCRIPTION OF THE INVENTION

The magnetic recording disk of the invention is further described below.

Preferred embodiments of the invention are as follows.

1) The above-mentioned magnetic recording disk wherein the lubricants of the magnetic layer and the non-magnetic layer comprise a fatty acid ester in their total amount of 5 to 15 weight %, preferably 7 to 12 weight %, based on the total amount of both the magnetic and non-magnetic undercoating layers.

2) The above-mentioned magnetic recording disk of claim 1, wherein the magnetic layer further contains 1 to 10 weight parts, preferably 1.5 to 5 weight parts, of carbon black per 100 weight parts of the ferromagnetic metal powder. The carbon black preferably has a mean particle size of 5 to 300 m$\mu$, preferably 20 to 150 m$\mu$, more preferably 50 to 120 m$\mu$.

3) The above-mentioned magnetic recording disk wherein the magnetic layer further contains 10 to 50 weight parts, preferably 15 to 30 weight parts, of an abrasive powder having a Mohs hardness of not less than 6 and a particle size of 0.01 to 0.5 $\mu$m, per 100 weight parts of the ferromagnetic metal powder. The abrasive powder preferably has a mean particle size of 0.01 to 0.5 $\mu$m, preferably 0.05 to 0.3 $\mu$m, more preferably 0.1 to 0.25 $\mu$m.

4) The above-mentioned magnetic recording disk wherein the ferromagnetic metal powder further contains a cobalt element in an amount of 15 to 40 atomic % based on the amount of iron element.

5) The above-mentioned magnetic recording disk wherein the ferromagnetic metal powder further contains a rare earth element such as Y in an amount of 1.5 to 12 atomic % based on the amount of iron element.

6) The above-mentioned magnetic recording disk wherein the ferromagnetic metal powder has a BET specific surface area of 45 to 80 m$^2$/g.

7) The above-mentioned magnetic recording disk wherein the ferromagnetic metal powder has a length of 0.02 to 0.25 $\mu$m in its longitudinal direction.

8) The above-mentioned magnetic recording disk wherein the ferromagnetic metal powder has an aspect ratio of 3 to 12.

9) The above-mentioned magnetic recording disk wherein the magnetic layer is adjusted to have a squareness ratio in the direction vertical to the plane of the magnetic layer in the ratio of 0.20 to 0.28, more preferably 0.23 to 0.28.

10) The above-mentioned magnetic recording disk wherein the non-magnetic layer has a thickness of 0.2 to 5.0 $\mu$m.

11) The above-mentioned magnetic recording disk wherein the magnetic layer has a thickness of 0.10 to 0.35 $\mu$m.

12) The above-mentioned magnetic recording disk wherein the magnetic layer has a center line average roughness at a cut-off value of 0.25 mm of 0.005 to 03 $\mu$m, more preferably 0.010 to 0.025 $\mu$m.

13) The above-mentioned magnetic recording disk wherein the magnetic layer has a thickness of 0.05 to 0.45 $\mu$m, preferably 0.10 to 0.35 $\mu$m.

14) The above-mentioned magnetic recording disk wherein the non-magnetic undercoating layer has a thickness of 0.2 to 5.0 $\mu$m, preferably 0.5 to 3.0 $\mu$m, more preferably 1.0 to 2.5 $\mu$m.

The magnetic recording disk of the invention comprises a flexible non-magnetic support, a non-magnetic layer which is arranged on at least one surface of the support and comprises a non-magnetic inorganic powder and a lubricant dispersed in a binder, and a magnetic layer which comprises a ferromagnetic metal powder and a lubricant dispersed in a binder.

The flexible non-magnetic support employable for the preparation of the magnetic recording disk according the invention is now described.

There are no specific limitations with respect to the support material, so long as it is non-magnetic and flexible. Most of materials having been employed for the supports of the conventional magnetic recording disks. Examples of the support materials include films of various polymers such as polyethylene terephthalate, polyethylene, polypropylene, polycarbonate, polyethylene naphthalate, polyamide, polyamideimide, polyimde, polysulfone, and polyethersulfone; and metallic foils such as aluminum foil and stainless steel foil. Preferred is a film of polyethylene terephthalate.

The non-magnetic support generally has a thickness in the range of 1 to 100 $\mu$m, preferably 4 to 85 $\mu$m.

The non-magnetic support to be employed in the invention may be subjected, in advance, to corona discharging, plasma discharging, adhesion-improving processing, thermal treatment or dust-removing treatment.

The non-magnetic support to be employed in the invention preferably has a center line average surface roughness (Ra: cut-off at 0.25 mm) of 0.03 $\mu$m or less, more preferably 0.02 $\mu$m or less, most preferably 0.01 $\mu$m or less. It is also preferred that the non-magnetic support has no large protrusions such as 1 $\mu$m or larger. The surface roughness and other surface conditions of the non-magnetic support can be controlled, if necessary, by varying the size and amount of the filler incorporated into the support. Examples of the fillers include oxides and carbonates of Ca, Si and Ti, and organic fine powders such as powdery acrylic resin.

On the support is arranged the non-magnetic undercoating layer and the magnetic layer.

The magnetic layer of the magnetic recording disk according to the invention is preferably formed on the non-magnetic undercoating layer while the non-magnetic undercoating layer is under wet condition. In more detail, the magnetic layer of the magnetic recording disk of the invention is formed on the non-magnetic undercoating layer simultaneously or just after the coating of the non-magnetic undercoating layer (coated layer) is made and while the non-magnetic undercoating layer is still wet. This process is named "wet-on-wet" process.

The coating according to the wet-on-wet process can be done, for instance, one of the following manners:

1) The non-magnetic layer is first formed by means of an apparatus for gravure coating, roll coating, blade coating, or extrusion coating, and the magnetic layer is then formed on the coated non-magnetic undercoating layer by means of a supported pressure extrusion apparatus while the coated non-magnetic undercoating layer is still wet. See Japanese Patent Provisional Publications No. H6-238179 and No. H2-265572, and Japanese Patent Publication No. H1-46186.

2) The non-magnetic undercoating layer and the magnetic layer are formed almost simultaneously by means of a coating apparatus equipped with a single head having two extrusion slits. See Japanese Patent Provisional Publications No. 63-88080, No. H2-17921, and No. H2-265672.

3) The non-magnetic undercoating layer and the magnetic layer are formed almost simultaneously by means of an extrusion coating apparatus equipped with a back-up roller. See Japanese Patent Provisional Publication No. H2-174965.

When any of the above-mentioned coating processes are employed, the coating solutions (dispersions) are preferably given a shear force inside of the coating head so as to obviate agglomeration of the ferromagnetic powder in the solution and lowering of the electromagnetic conversion property of the resulting magnetic recording disk.

The combination of the non-magnetic undercoating layer and the magnetic layer can be formed on one side or both sides of the non-magnetic support.

The non-magnetic undercoating layer preferably has a thickness in the range of 0.2 to 5 μm, more preferably 0.5 to 3.0 μm, most preferably 1.0 to 2.5 μm.

The magnetic layer preferably has a thickness in the range of 0.05 to 0.45 μm, more preferably 0.10 to 0.35 μm.

The non-magnetic undercoating layer of the magnetic recording disk of the invention comprises a non-magnetic inorganic powder, a lubricant, and a binder.

The non-magnetic inorganic powder preferably has a relatively high hardness, such as a Mohs hardness of not less than 5, more preferably of not less than 6, and preferably has a mean diameter of 0.005 to 2.0 μm, more preferably 0.01 to 0.2 μm.

Examples of the non-magnetic inorganic powders employable in the invention include α-alumina (which is converted into the α-phase of 90% or more), β-alumina, γ-alumina, silicon carbide, chromium oxide, cerium oxide, α-iron oxide, corundum, silicon nitride, titanium carbide, titanium dioxide, silicon dioxide (silica), boron nitride, zinc oxide, calcium carbonate, calcium sulfate, and barium sulfate. These powders can be employed singly or in combination.

Concrete examples of the non-magnetic inorganic powders employable in the invention include AKP-10, AKP-12, AKP-15, AKP-18, AKP-20, AKP-30, AKP-50, HIT-50, HIT-55, HIT-60, and HIT-100 (all are available from Sumitomo Chemical Industry Co., Ltd.), G5, G7 and S-1 (all available from Nippon Chemical Industry Co., Ltd.), TTO55 and ET300W (both available from Ishihara Sangyou Co., Ltd.), and STT 30 (available from Titan Industry Co., Ltd.).

The lubricant serves reducing the friction between the surface of the magnetic layer and the magnetic head and keeping smooth slide contact therebetween, after it emigrates into the magnetic layer formed on the non-magnetic undercoating layer. Examples of the lubricants include silicone oils such as dialkyl polysiloxane (alkyl has carbon atoms of 1 to 5), dialkoxy polysiloxane (alkoxy has carbon atoms of 1 to 4), monoalkyl monoalkoxy polysiloxane (alkyl has carbon atoms of 1 to 5 and alkoxy has carbon atoms of 1 to 4), phenyl polysiloxane, and fluoroalkylpolysiloxane (alkyl has carbon atoms of 1 to 5) ; electroconductive fine powders such as graphite; inorganic powder such as molybdenum disulfide powder and tungsten disulfide powder; plastic fine powders such as powders of polyethylene, polypropylene, polyethylenevinyl chloride copolymer, and polytetrafluroethylene; α-olefin polymer; unsaturated aliphatic hydrocarbon which is at a liquid state at room temperature (e.g., a compound having a double bond of n-olefin at the end, carbon atoms of approximately 20); fatty acid esters of a monobasic fatty acid having 12 to 20 carbon atoms and a monohydric alcohol having 3 to 12 carbon atoms; and fluorocarbons. Most preferred are fatty acid esters.

Examples of alcohols employable for preparing suitable fatty acid esters include monohydric alcohols such as ethanol, butanol, phenol, benzyl alcohol, 2-methylbutyl alcohol, 2-hexyldecyl alcohol, prcpylene glycol monobutyl ether, ethylene glycol monobutyl ether, dipropylene glycol monobutyl ether, diethylene glycol monobutyl ether, and sec-butyl alcohol; and polyhydric alcohols such as ethylene glycol, diethylene glycol, neopentyl glycol, glycerol and sorbitol derivatives. These alcohols can be employed singly or in combination.

Examples of fatty acids include aliphatic carboxylic acids such as acetic acid, propionic acid, octanoic acid, 2-ehtylhexanoic acid, lauric acid, myristic acid, stearic acid, palmitic acid, behenic acid, arachic acid, oleic acid, linoleic acid, linolenic, elaidic and palmitoleic acid. These fatty acid can be employed singly or in combination.

Concrete examples of the above-mentioned fatty acid esters include butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixture of butyl stearate and butyl palmitate, oleyl oleate, butoxyethyl stearate, 2-butoxy-1-propyl stearate, dipropylene glycol monobutyl ether acylated with stearic acid, diethylene glycol dipalmitate, hexamethylenediol acylated with myristic acid, and oleates of various glycerols.

The lubricant can be incorporated into the non-magnetic undercoating layer in an amount of 0.2 to 20 weight parts per 100 weight parts of the whole non-magnetic inorganic powders in the non-magnetic undercoating layer.

The binder employable for the preparation of the non-magnetic undercoating layer may be a thermoplastic resin, a thermosetting resin, a reactive-type resin, or their mixtures.

The thermoplastic resin preferably has a glass transition point in the range of −100° to 150° C., a number average molecular weight in the range of 1,000 to 200,000, preferably 10,000 to 100,000, and a polymerization degree in the range of approximately 50 to 1,000.

Examples of such thermoplastic resins include homopolymers and copolymers having as their constitutional units, vinyl chloride, vinyl acetate, vinyl alcohol, maleic acid, acrylic acid, acrylic esters, vinylidene chloride, acrylonitrile, methacrylic acid, methacrylic esters, styrene, butadiene, ethylene, vinyl butyral, vinyl acetal, and/or vinyl ethers; polyurethane resins, and various elastic resins.

Examples of the thermosetting resins and the reactive-type resins include phenol resin, epoxy resin, curable polyurethane resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate.

These resins are described in detail in "Plastic Handbook" of new version (written in Japanese, published in 1985 by Asakura Shoten).

Also employable is an electron beam-curable resin. Examples of such resin and their preparations are described in detail in Japanese Patent Provisional Publication No. 62-256219.

The above-mentioned resins can be employed singly or in combination.

In the invention, combinations of polyurethane and at least one resin selected from the group consisting of vinyl chloride resin, vinyl chloride-vinyl acetate copolymer, vinyl chloride-vinyl acetate-vinyl alcohol copolymer, vinyl chloride-vinyl acetate-maleic anhydride copolymer, and nitrocellulose, if desired further in combination with polyisocyanate, are preferred.

The above-mentioned polyurethane resin can be known polyester polyurethane, polyether polyurethane, polyether polyester polyurethane, polycarbonate polyurethane, polyester polycarbonate polyurethane and polycaprolactone polyurethane.

The above-mentioned binder polymers can contain at least one polar group selected from the group consisting of —COOM, —SO$_3$M, —SO$_3$M, —P=O(CM)$_2$, —O—P=O (OM)$_2$ (M is hydrogen atom or an alkali metal), —OH, —NR$_2$, —N$^+$R$_3$ (R is a hydrocarbon group), epoxy group, —SH, and —CN. These polar groups can be incorporated into the binder polymer by copolymerization or addition reaction.

The polar group is preferably incorporated into the binder polymer in an amount of $10^{-1}$ to $10^{-8}$ mole/g, more preferably $10^{-2}$ to $_{10}{}^{-6}$ mole/g.

The polyurethane preferably has a glass transition point in the range of −50° to 100° C., an elongation at rupture in the range of 100 to 2,000%, a breaking stress in the range of 0.05 to 10 kg/cm$^2$, a break-down point in the range of 0.05 to 10 kg/cm$^2$.

Concrete examples of the binder polymer employable in the invention include VAGH, VYHH, VMCH, VAGF, VAGD, VROH, VYES, VYNC, VMCC, XYHL, XYSG, PKHH, PKHJ, PKHC and PKFE (all available from Union Carbide Corp.), MPR-TA, MPR-TA5, MPR-TAL, MPR-TSN, MPR-TMF, MPR-TS and MPR-TM (all available from Nisshin Chemical Industry Co., Ltd.), 1000W, DX80, DX81, DX82 and DX 83 (all available from Denki Kagaku Kogyo Co., Ltd.), MR110, MR100 and 400X110A (all available from Nihon Geon Co., Ltd.), Nipporan N2301, N2302 and N2304 (all available from Nippon Polyurethane Industries Co., Ltd.), Pandex T-5105, T-R3080, T-5201, Bernock D-400, D-210-80, Crysbon 6109 and 7209 (all available from Dai-Nippon Ink and Chemical Industries Co., Ltd.), Byron UR8200, UR8300, UR8600, UR5500, RV530 and RV280 (all available from Toyobo Co., Ltd.), Daipheramine 4020, 5020, 5100, 5300, 9020, 9022, and 7020 (all available from Dainippon Seika Co., Ltd.), MK5004 (available from Mitsubishi Chemical Industries Co., Ltd.), Sunplene SP-150 (available from Sanyou Chemical Industry Co., Ltd.), and Saran F310 and F210 (both available from Asahi Kasei Co., Ltd.).

Examples of the polyisocyanates include isocynates such as tolylene diisocyanate, 4,4-diphenylmethane diisocyanate, hexamethylene diisocyanate, xylylne diisocyanate, naphthylene-1,5-diisocyanate, o-toluidine diisocyanate, isophorone diisocyanate, and triphenylmethane triisocyanate; reaction products of these isocyanates and polyalcohols; and polyisocyanates produced by condensations of isocyanates.

Concrete examples of these isocyanates include Colonate L, Colonate HL, Colonate 2030, Colonate 2031, Millionate MR, Millionate MTL (all available from Nippon Polyurethane Industries Co., Ltd.), Takenate D-102, Takenate D-110N, Takenate D-200, and Takenate D-202 (all available from Takeda Pharmaceutical Industry Co., Ltd.), and Desmodule L, Desmodule IL, Desmodule N and Desmodule HL (all available from Sumitomo Bayer Co., Ltd.). These isocyanates can be employed singly or in combination.

In the invention, the binder polymer can be employed in the range of 5 to 50 weight parts, preferably 10 to 30 weight parts, based on 100 weight parts of the non-magnetic powder in the non-magnetic undercoating layer.

If the binder polymer is to be produced by the combination of vinyl chloride resin, polyurethane resin, and polyisocyanate, they are incorporated in the following amounts: 5 to 70 weight % for vinyl chloride resin, 2 to 50 weight % for polyurethane resin, and 2 to 50 weight % for polyisocyanate.

Other materials which may be incorporated into the non-magnetic undercoating layer are below described.

The non-magnetic undercoating layer can contain carbon black. The addition of carbon black serves for imparting electroconductivity to the magnetic recording disk to obviate electrostatic deposition and for ensuring smooth surface of the magnetic layer, whereby decreasing spacing loss between the surface of the magnetic layer and the recording/reproducing head to give high output powder. Any of various kinds of carbon blacks produced by various processes can be utilized in the invention. Examples of the carbon blacks include furnace black, thermal black, acetylene black, channel black, and lamp black. Concrete examples of the carbon blacks employable in the invention include BLACKPEARL S 2000, 1300, 1000, 900, 800, 700, VULCAN XC-72 (all available from Cabbot Corporation), #35, #50, #55, #60 and #80 (all available from Asahi Carbon Co., Ltd.), #3950B, #3750B, #3250B, #2400B, #2300B, #1000, #900, #40, #30 and #10B (all wavailable from Mitsubishi Chemical Industries Co., Ltd.), CONDUCTEX SC, RAVEN, 150, 50, 40, 15 (all available from Columbia Carbon Corporation), and Ketchen Black EC, Ketchen Black ECDJ-500 and Ketchen Black ECDJ-600 (all available from Lion-Akzo Co., Ltd.).

Other examples of carbon blacks employable in the invention are seen, for. instance, in "Handbook of Carbon Black" (in Japanese Language, edited by Society of Carbon Black, published by Tosho Shuppan, 1970).

The amount of carbon black to be incorporated into the non-magnetic undercoating layer generally is not more than 50 weight parts, preferably in the range of 3 to 20 weight parts, more preferably 5 to 15 weight parts, based on 100 weight parts of the non-magnetic inorganic powder in the non-magnetic undercoating layer.

The magnetic layer comprises a ferromagnetic metal powder and a lubricant dispersed in a binder.

The magnetic metal powder preferably has a specific surface area (BET) in the range of 40 to 80 m$^2$/g, preferably 50 to 70 m$^2$/g, and a crystallite size of 80 to 350 angstroms, preferably 100 to 250 angstroms, more preferably 140 to 200 angstroms (determined by X-ray diffraction). The ferromagnetic metal powder employed in the invention should contain Fe. For instance, they should be powders of iron per se or iron alloys such as Fe, Fe-Co, Fe-Ni, and Fe-Ni-Co. These ferromagnetic metal alloy powders preferably have saturation magnetization ($\sigma$s) of 100 to 180 emu/g, more preferably 110 to 170 emu/g, most preferably 125 to 160 emu/g, for enabling the desired high density recording. The coercive force preferably is 1400 to 3,500 Oe (Oersted), more preferably 1,800 to 3,000 Oe. The longitudinal length of the ferromagnetic metal powder (that is, a mean particle size) determined by electromicroscope of transmission type is preferably 0.02 to 0.25 $\mu$m, more preferably 0.05 to 0.15 $\mu$m, most preferably 0.06 to 0.1 $\mu$m, and a aspect ratio, namely, the ratio of length in the longitudinal direction/length in the direction vertical to the longitudinal direction (i.e., shorter direction) preferably is in the range of 3 to 12, more preferably 4 to 8.

The ferromagnetic metal powder contains Al, and further may contain a rare earth element such as Y or La. The ferromagnetic metal powder may further contain one or more non-metals such as B, C, Si and P for improving its various performance. The surface of the ferromagnetic metal powder generally has an oxidized layer for chemically stabilizing the electromagnetic property of the powder.

The above-described ferromagnetic powders preferably contain 0.01 to 2 weight % of water. The water content can be adjusted in consideration of the properties of the binder resin to be employed in combination. The pH of the ferromagnetic powder is preferably adjusted to an appropriate level in consideration of the property of the binder resin to be employed in combination. Generally, the appropriate pH range is from 4 to 12, preferably from 5 to 10. The ferromagnetic powder can be treated with Al, Si, P and/or their oxides on its surface, if desired. The amounts of these element for the surface treatment are generally in the range of 0.1 to 10 weight %. Such surface treatment serves to reduce adsorption of the lubricant by the surface of the ferromagnetic metal powder to a level of 100 mg/m$^2$ or less. Sometimes, the ferromagnetic powder may contain a small amount of soluble inorganic ions such as ions of Na, Ca, Fe, Ni and Sr.

The lubricant for the magnetic layer can be the same as the conventional one which is described for the material of the non-magnetic -undercoating layer. The amount of the lubricant which can be incorporated into the magnetic layer generally is in the range of 1 to 20 weight parts, preferably 5 to 15 weight parts, based on 100 weight parts of the ferromagnetic metal powder in the magnetic layer.

The magnetic layer of the magnetic recording disk of the invention can contain carbon black (conventionally employed electroconductive material) and an abrasive powder.

The carbon black can be the same as that described for the material of the non-magnetic layer.

Examples of the abrasive powders include melted alumina, silicon carbide, chromium oxide ($Cr_2O_3$), corundum, artificial corundum, diamond, artificial diamond, garnet, and emery (main ingredients: corundum and magnetite). These abrasive powder preferably has a Mohs' hardness of not lower than 5, preferably not lower than 6. the abrasive powder preferably has a mean particle size in the range of 0.01 to 0.5 µm, more preferably 0.05 to 0.3 µm, most preferably 0.1 to 0.25 µm. The abrasive powder is preferably incorporated into the magnetic layer in an amount of 10 to 50 weight parts, specifically 15 to 30 weight parts, per 100 weight parts of the ferromagnetic metal powder.

The binders employable for the formation of the magnetic layer of the magnetic recording disk according to the invention can be those described hereinbefore for the non-magnetic undercoating layer.

The magnetic layer and the non-magnetic under layer of the magnetic recording disk of the invention can further contain a dispersant, a plasticizer, an electroconductive powder (anti-static agent) other than carbon black, and an anti-mildew agent, in addition to the aforementioned materials.

The representative processes advantageously employed for preparing the magnetic recording disk of the invention are described below in detail.

The process for the preparation of the magnetic recording disk of the invention generally comprises a coating stage, a slitting stage, a punching stage, and a stage for encasing the punched disk into a cartridge. The coating stage preferably comprises the aforementioned step for forming the non-magnetic undercoating layer and magnetic layer by the wet-on-wet coating process, a step for random orientation of the magnetic powder in the magnetic layer while the coated non-magnetic and magnetic layers are still wet, a step for drying the non-magnetic layer and the magnetic layer and a calendaring step for smoothing the surface of the magnetic layer. These steps are further described below in more detail.

Each of the coating solutions (i.e., coating liquids or mixtures) for forming the non-magnetic undercoating layer and the magnetic layer can be prepared by kneading and dispersing the appropriate ingredients and the binder in an organic solvent. The coating solution can be produced by a process comprising a kneading step and a dispersing step. A step for mixing the appropriate ingredients can be placed before, after and between these steps. Each step can comprise two or more separate steps. Each of these ingredients can be introduced in or before an optionally chosen step. One ingredient can be divided and incorporated into the solution separately. For instance, the whole amount of the binder such as polyurethane can be divided into plural portions, and each portion can be incorporated into the mixture solution during or after optionally chosen steps such as during the kneading step, during the dispersing step, and after the dispersing step, whereby adjusting the viscosity of the coating solution at each step.

Examples of the solvents employed for the preparation of the coating solutions include ketones such as acetone, methyl ethyl ketone, methyl isobutyl ketone, diisobutyl ketone, cyclohexanone, and isophorone; alcohols such as methanol, ethanol, propanol, butanol, isobutyl alcohol, isopropyl alcohol, and methylcyclohexanol; esters such as methyl acetate, ethyl acetate, butyl acetate, isobutyl acetate, isopropyl acetate, ethyl lactate and glycol acetate; ethers such as diethyl ether and tetrahydrofuran; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. Any of these organic solvents are not necessary of 100% pure, and can contain a small amount of impurities such as isomers, unreacted compounds, by-products, decomposed compounds, and oxidized compounds. The contents of such impurities are preferred to be 30% or less, more preferably 10% or less.

The solvent and its amount can be varied between the coating solution for the formation of the magnetic layer and the coating solution for the formation of the non-magnetic layer. For instance, a highly volatile solvent can be employed for the coating solution for the magnetic layer to improve its surface smoothness. A solvent having a high surface tension such as cyclohexanone or dioxane can be employed for increasing stability of the coated magnetic layer. A solvent having a high solubilizing parameter can be used for increasing the packing density of the non-magnetic layer.

Before the forming the non-magnetic layer, an auxiliary thin subbing layer can be placed on the support. The thickness of the thin subbing layer preferably is in the range of 0.01 to 2 µm, more preferably 0.05 to 0.5 µm. If the combination of the non-magnetic undercoating layer and magnetic layer is provided only on one surface of the non-magnetic support, other surface can be provided with a back-coat layer. The thickness of the backcoat layer preferably is in the range of 0.1 to 2 µm, more preferably 0.3 to 1.0 µm. The thin subbing layer and the back-coat layer can be formed on the support in any of the manners known for the preparations of magnetic recording tapes and magnetic recording disks.

The non-magnetic undercoating layer and the magnetic layer are then formed by any of the aforementioned wet-on-wet coating processes.

Subsequently, the magnetic layer is subjected to random orientation, while it is still wet, that is, under wet condition.

The random orientation can be performed by the use of a permanent magneto, or by application of AC magnetic field. The latter procedure is preferably employed in the invention. In more detail, the composite of the wet non-magnetic layer and the wet magnetic layer is passed through a pair of two alternating current magnetic fields. The frequency and the magnetic field strength of each A.C. magnetic field is generally 50 Hz, 50 to 500 Oe, and 120 Hz, 50 to 500 Oe. Preferably, the orientation ratio should be adjusted to 0.85 or more by the random orientation processing of the ferromagnetic powder. Under such conditions, a regeneration output can be made to the same level at any radial directions of the disk.

The non-magnetic undercoating layer and magnetic layer on the support having been subjected to the random orientation procedure are dried and then subjected to the calendaring processing.

The calendaring is performed by the composite of the support, the non-magnetic layer and the magnetic layer having been dried through a set of heated rollers. The rollers are preferably plastic rollers made of heat resistant plastic material such as epoxy resin, polyimide resin, polyamide resin, or polyamideimide resin. A metallic rollers can be used. Preferred calendaring conditions are as follows: heating temperature in the range of 70° to 120° C., preferably 80° to 110° C., and a linear pressure in the range of 200 to 450 kg/cm, preferably 250 to 400 kg/cm. The calendaring machine is preferably provided with 5 to 11 sets of rollers which can be operated at a rate of 50 to 500 m/min.

The calendared body is then slitted and punched to give a magnetic recording disk. The produced disk is then encased in an appropriate cartridge.

The magnetic recording disk of the invention preferably has a surface resistivity on its magnetic layer in the range of $1 \times 10^5$ to $5 \times 10^9$ ohm/sq. The breaking strength of the magnetic layer preferably is in the range of 1 to 30 kg/cm$^2$. The heat shrinkage at 100° C. preferably is 1% or less, more preferably 0.5% or less, most preferably 0.1% or less. The amount of the solvent remaining in the magnetic layer preferably is not more than 100 mg/m$^2$, more preferably not more than 10 mg/m$^2$. It is preferred that the amount of the solvent remaining in the magnetic layer is less than the amount of the solvent remaining in the non-magnetic undercoating layer.

The magnetic recording layer of the invention can be adjusted in its physical properties with respect to both the magnetic layer and the non-magnetic undercoating layer, if desired. For instance, the modulus of elasticity of the magnetic layer can be increased to improve the running endurance. If the modulus of elasticity of the non-magnetic undercoating layer is adjusted to become less than the modulus of elasticity of the magnetic layer, the contact to a magnetic head of the magnetic recording disk of the invention can be improved.

The specifically defined squareness ratio in the direction vertical or perpendicular to the plane of the magnetic layer can be given to the magnetic layer, for instance, by adjusting the strength and type of magnetic field which is employed in the orientation step, adjusting the coating conditions such as the coating speed, and the temperature and moving rate of an air to be applied to the coated magnetic layer, or adjusting the calendering conditions such as the nature of the calendering rollers, the calendering temperature, or the calendering pressure. These adjustments can be employed singly or in combination, so that an appropriate amount of the acicular ferromagnetic particles is arranged to have a certain angle to the plane of the magnetic layer, to give the specific squareness ratio. The resulting magentic layer shows an increased phsical strength essentially keeping the good electromagnetic conversion ratio such as high S/N.

The magnetic recording and reproducing method of the invention can be performed using the above-mentioned magnetic recording disk of the invention. When the magnetic recording disk of the invention is employed, a digital signal having a minimum recording wavelength (i.e., a shortest recording wavelength recorded on the inner periphery of the magnetic recording disk in the case of recording at a constant rate) of 1. 5 μm or less can be recorded and reproduced. Further, since the thickness of the magnetic layer of the magnetic recording disk of the invention is so thin as to be 0.5 μm or less, the overwriting property which should be noted in the digital recording is improved.

The method of recording and reproducing digital signal on the magnetic recording disk can be made under the condition that the disk is kept to be in contact with a magnetic head or not. In the latter case, the magnetic recording disk is kept apart from the magnetic head.

The recording and reproducing under the condition that the recording disk is kept in contact with a magnetic head can be performed according to the cymbal system which is adopted in the commercially available floppy disk drives for floppy disks of 3.5 inches, 5 inches, 8.5 inches, etc. In this system, the magnetic head is placed on the disk under a certain pressure or the disk is sandwiched between magnetic heads. The rotation rate of the disk generally is in the range of 200 to 2,000 r.p.m. If the rotation rate is too high, an air is introduced between the head and the disk, which disturbs reliable contact of the disk to the head.

The recording and reproducing under the condition that the recording disk is kept not in contact with the magnetic head can be performed in such commercially available disk drives using such head mechanism as of Winchester system or according to Verneuil Effect. The disk is preferably rotated at a high speed such as at a rotation rate of 2,000 to 15,000 r.p.m., so as to ensure stable non-contact conditions and increase the data transfer rate.

The invention is further described by the following examples, in which "part (s)" means "part (s) by weight", unless otherwise specified.

EXAMPLE 1

[Preparation of Coating solutions for forming Magnetic layer and Non-magnetic undercoating layer]

| | part(s) |
|---|---|
| (1) Magnetic layer | |
| Ferromagnetic metal powder (Fe:Co = 80:20, Al/Fe = 10.8 atomic %, Y/Fe = 6.0 atomic %, coercive force (HC): 1,850 Ce, BET specific surface area: 57 m$^2$/g, saturation magnetization (σs): 130 emu/g, crystallite size: 175 angstroms, particle size (longitudinal): 0.1 μm, aspect ratio: 6) | 100 |
| Vinyl chloride copolymer containing polar group (—SO$_3$Na) (MR-110, tradename, product available from Nihon Geon Co., Ltd.) | 10 |

-continued

| | part(s) |
|---|---|
| Polyester polyurethane resin containing polar group (—SO$_3$Na) (UR-5500, tradename, product available from Toyobo Co., Ltd.) | 4 |
| α-Alumina (HIT 55, mean particle size: 0.2 μm, available from Sumitomo Chemical Industry Co., Ltd.) | 20 |
| Carbon black (#50, mean particle size: 80 mμ, available from Asahi Carbon Co., Ltd.) | 3 |
| Isohexyldecyl stearate | 12 |
| Stearic acid | 1 |
| Oleic acid | 1 |
| Methyl ethyl ketone | 180 |
| Cyclohexanone | 180 |
| (2) Non-magnetic layer | |
| Titanium dioxide (rutile, TiO$_2$ content: more than 90%, mean particle size: 0.035 μm, BET specific surface area: 40 m$^2$/g, pH 7.0, DBP oil absorption: 27–38 g/100 g Mohs' hardness: 6.0) | 100 |
| Carbon black (Ketchen Black EC, tradename, product available from Lion-Akzo Co., Ltd.) | 13 |
| Vinyl chloride copolymer containing polar group (—SO$_3$Na) (MR-110, tradename, product available from Nihon Geon Co., Ltd.) | 17 |
| Polyester polyurethane resin containing polar group (—SO$_3$Na) (UR-5500, tradename, product available from Toyobo Co., Ltd.) | 6 |
| Isohexyldecyl stearate | 16 |
| Stearic acid | 2 |
| Oleic acid | 1 |
| Methyl ethyl ketone/cyclohexanone (8/2) | 250 |

(3) Preparation of the coating solutions

The ingredients of the magnetic layer and the non-magnetic undercoating layer were separately kneaded in a continuous kneader and dispersed in a sand mill. Polyisocyanate (Colonate, tradename, product available from Nihon Polyurethane Industry Co., Ltd.) was added to the resulting dispersion (13 parts for the non-magnetic layer coating solution, and 4 parts for the magnetic layer coating solution). Subsequently, 40 parts of butyl acetate were added to both solutions. Both solutions were filtered over a filter having a mean pore size of 1 μm to give a coating solution for non-magnetic coating layer and a coating solution for magnetic layer.

[Preparation of Magnetic Recording Disk]

The resulting coating solutions for non-magnetic undercoating layer and magnetic layer were coated on both surface of a polyethylene phthalate support (thickness: 62 μm, center line surface roughness: 0.01 μm, cut-off at 0.25 mm) by the simultaneous double coating method under the conditions that the thickness after dryness of the non-magnetic layer should become 1.5 μm, and the thickness after dryness of the magnetic layer on the non-magnetic layer should become 0.2 μm. Then, while both coated layers were still wet, they were passed through a pair of A.C. magnetic field generators (frequency 50 Hz, magnetic field strength 250; and frequency 50 Hz, magnetic field strength 120) for attaining random orientation.

They were then dried and calendared in a calendar machine having seven sets of rollers (temperature 90° C., linear pressure 300 kg/cm). The calendared product was punched to give a disk having a diameter of 3.7 inches. The disk was polished on its surfaces and encased into a cartridge of 3.7 inches (zip-disk cartridge available from Iomega, U.S.A.) having inside liners, and the cartridge was equipped with necessary mechanical parts.

EXAMPLES 2 to 3

The procedures of Example 1 were repeated except that the a support having a different surface roughness was employed to give a magnetic layer having a surface roughness (Ra) as set forth in Table 1.

EXAMPLES 4 to 6

The procedures of Example 1 were repeated except that the magnetic layer was coated to give the thickness as set forth in Table 1.

EXAMPLES 7 to 8

The procedures of Example 1 were repeated except that the magnetic layer was coated to give a squareness ratio in the direction vertical to the plane of the magnetic layer, as set forth in Table 1.

EXAMPLES 9 to 10

The procedures of Example 1 were repeated except that a ferromagnetic metal powder having Al element in the amount set forth in Table 1 was employed.

EXAMPLES 11 to 14

The procedures of Example 1 were repeated except that the amount of fatty acid ester was changed into the amount set forth in Table 1.

EXAMPLES 15 to 17

The procedures of Example 1 were repeated except that the amount of abrasive powder was changed into the amount set forth in Table 1 so as to vary the surface roughness (Ra) of the magnetic layer.

EXAMPLES 18 to 20

The procedures of Example 1 were repeated except that the amount of carbon black was changed into the amount set forth in Table 1 so as to vary the surface roughness (Ra) of the magnetic layer.

COMPARISON EXAMPLES 1 to 2

The procedures of Example 1 were repeated except that the conditions of orientation procedure were so changed as to give a magnetic layer having a squareness ratio in the direction vertical to the plane of the magnetic layer, as set forth in Table 1.

COMPARISON EXAMPLES 3 to 4

The procedures of Example 1 were repeated except that a ferromagnetic metal powder having Al element in the amount set forth in Table 1 was employed.

COMPARISON EXAMPLE 5

The procedures of Example 1 were repeated except that the a support having a different surface roughness was employed to give a magnetic layer having a surface roughness (Ra) of 0.040 μm as set forth in Table 1.

COMPARISON EXAMPLE 6

The procedures of Example 1 were repeated except that the magnetic layer was coated to give the thickness of 0.6 μm as set forth in Table 1.

COMPARISON EXAMPLE 7

The procedures of Example 1 were repeated except that the non-magnetic undercoating layer was not provided on the support.

TABLE 1

| | | | Magnetic layer | | | | |
|---|---|---|---|---|---|---|---|
| | Ra ($\mu$m) | thickness ($\mu$m) | SQ | abrasive content | carbon content | ester content | Ferromag. powder Al content |
| Ex. | | | | | | | |
| 1 | 0.020 | 0.2 | 0.25 | 20 | 3.0 | 10 | 10.8 |
| 2 | 0.030 | 0.2 | 0.25 | 20 | 3.0 | 10 | 10.8 |
| 3 | 0.010 | 0.2 | 0.25 | 20 | 3.0 | 10 | 10.8 |
| 4 | 0.020 | 0.1 | 0.25 | 20 | 3.0 | 10 | 10.8 |
| 5 | 0.020 | 0.3 | 0.25 | 20 | 3.0 | 10 | 10.8 |
| 6 | 0.020 | 0.5 | 0.25 | 20 | 3.0 | 10 | 10.8 |
| 7 | 0.020 | 0.2 | 0.15 | 20 | 3.0 | 10 | 10.8 |
| 8 | 0.020 | 0.2 | 0.30 | 20 | 3.0 | 10 | 10.8 |
| 9 | 0.020 | 0.2 | 0.25 | 20 | 3.0 | 10 | 5.0 |
| 10 | 0.020 | 0.2 | 0.25 | 20 | 3.0 | 10 | 30.0 |
| 11 | 0.020 | 0.2 | 0.25 | 20 | 3.0 | 3 | 10.8 |
| 12 | 0.020 | 0.2 | 0.25 | 20 | 3.0 | 5 | 10.8 |
| 13 | 0.020 | 0.2 | 0.25 | 20 | 3.0 | 15 | 10.8 |
| 14 | 0.020 | 0.2 | 0.25 | 20 | 3.0 | 18 | 10.8 |
| 15 | 0.010 | 0.2 | 0.25 | 5 | 3.0 | 10 | 10.8 |
| 16 | 0.015 | 0.2 | 0.25 | 10 | 3.0 | 10 | 10.8 |
| 17 | 0.030 | 0.2 | 0.25 | 50 | 3.0 | 10 | 10.8 |
| 18 | 0.010 | 0.2 | 0.25 | 20 | 0.5 | 10 | 10.8 |
| 19 | 0.015 | 0.2 | 0.25 | 20 | 1.0 | 10 | 10.8 |
| 20 | 0.030 | 0.2 | 0.25 | 20 | 5.0 | 10 | 10.8 |
| Comparison Example | | | | | | | |
| 1 | 0.020 | 0.2 | 0.10 | 20 | 3.0 | 10 | 10.8 |
| 2 | 0.020 | 0.2 | 0.35 | 20 | 3.0 | 10 | 10.8 |
| 3 | 0.020 | 0.2 | 0.25 | 20 | 3.0 | 10 | 2.0 |
| 4 | 0.020 | 0.2 | 0.25 | 20 | 3.0 | 10 | 35.0 |
| 5 | 0.040 | 0.2 | 0.25 | 20 | 3.0 | 10 | 10.8 |
| 6 | 0.020 | 0.6 | 0.25 | 20 | 3.0 | 10 | 10.8 |
| 7* | 0.020 | 0.2 | 0.25 | 20 | 3.0 | 10 | 10.8 |

Remarks:
Ra: center line average roughness at a cut-off value of 0.25 mm: Three dimensional surface roughness meter (Kosaka Laboratories Co., Ltd.) was enployed.
thickness: thickness of magnetic layer: determined by obtaining a section image of the magnetic layer by means of a scanning electron microscope S-700 (available from Hitachi, Ltd.)
SQ: squareness ratio in the direction vertical to the plane of the magnetic layer: determined at Hm 10K Oe by means of a sample-vibrating magnetic flux meter (Toei Industry Co., Ltd.). No diamagnetic field compensation is made.
abrasive content: content of abrasive powder in terms of weight parts per 100 weight parts of ferromagnetic powder
carbon content: content of carbon black powder in terms of weight parts per 100 weight parts of ferromagnetic powder
ester content: content of the ester lubricant in both the magnetic layer and non-magnetic undercoating layer, in terms of weight % per the total amount of these layers: determined by weighing the previously separated magnetic and non-magnetic undercoating layers, extracting these layers with a distilled n-hexane at 60° C. for 2 hours, and then further extracting them with n-hexane at 60° C. for 1 hour, combining the extracts, placing the combined extracts under reduced pressure to dryness, dissolving the dried extracts in n-hexane, and measuring the fatty acid ester in the dried extracts by gas chromatography after addition of an internal reference. The value is expressed in terms of a weight % based on the total amount of the magnetic and non-magnetic undercoating layers.
Ferromag. powder Al content: content of aluminum element in the ferromagnetic metal powder in terms of atomic % based on the amount of Fe element in the powder
*magnetic recording disk having the magnetic layer directly formed on the support

[Evaluation of Magnetic Recording Disk]

Various characteristics of the obtained magnetic recording disk were evaluated in the following manner.

(1) Evaluation of S/N

The S/N was determined by measuring a regeneration output (TAA) at a linear recording density of 60 KFCI in the radial position of 24.6 mm and a noise level after DC erasure. The disk evaluating device RWA 1001 (available from GUZIK Corporation, U.S.A.) and Spin Stand LS-90 (equipped with a metal in-gap head having a gap length of 0.3 $\mu$m) were utilized.

(2) Evaluation of Bit-Shift

The bit-shift was determined by measuring a bit shift (ns) which was observed when a pattern of "245BC81169336E99E4C" was recorded at HF frequency and LF frequency (recording modulation system: 1-8RLL) corresponding to the maximum linear recording density of 60 KFCI in the radial position of 24.6 mm. The disk evaluating device RWA 1001 (available from GUZIK Corporation, U.S.A.) and Spin Stand LS-90 (equipped with a metal in-gap head having a gap length of 0.3 $\mu$m) were utilized.

(3) Running Endurance (or Durability)

A signal was recorded on a floppy disk at a recording density of 34 kfci in a floppy disk drive (ZIP 100, rotation: 2,968 r.p.m., Iomega Corporation, U.S.A.) in which the head is fixed in the radial position of 38 mm) and then regenerated. The regenerated value was made to 100%. Thereafter, the floppy disk was continuously rotated under the thermocycle conditions for 1,000 hours:

Thermocycle flow:

1): 25° C., 50% RH, 1 hr.→heating, 2 hr.→
2): 60° C., 20% RH, 7 hrs.→cooling, 2 hrs.→
3): 25° C., 50% RH, 1 hr.→coolimg, 2 hrs.→
4): 5° C., 10% RH, 7 hrs.→heating, 2 hrs.→1)

After the rotation started, the floppy disk was monitored every 24 hours for measuring the output, and "NG" was given when the output reached 70% of the initial value.

The results of the above evaluations are set forth in Table 2.

TABLE 2

| | S/N (dB) | Bit Shift (ns) | Running durability (hours) |
|---|---|---|---|
| Example | | | |
| 1 | 28 | 10 | >1,000 |
| 2 | 26 | 10 | >1,000 |
| 3 | 30 | 10 | >1,000 |
| 4 | 26 | 8 | >1,000 |
| 5 | 29 | 12 | >1,000 |
| 6 | 30 | 14 | >1,000 |
| 7 | 28 | 10 | >1,000 |
| 8 | 28 | 12 | >1,000 |
| 9 | 29 | 10 | >1,000 |
| 10 | 25 | 10 | >1,000 |
| 11 | 28 | 10 | 800 |
| 12 | 28 | 10 | >1,000 |
| 13 | 28 | 10 | >1,000 |
| 14 | 28 | 10 | 800 |
| 1s | 30 | 10 | 800 |
| 16 | 29 | 10 | >1,000 |
| 17 | 26 | 10 | >1,000 |
| 18 | 30 | 10 | 800 |
| 19 | 29 | 10 | >1,000 |
| 20 | 26 | 10 | >1,000 |

TABLE 2-continued

|  | S/N (dB) | Bit Shift (ns) | Running durability (hours) |
|---|---|---|---|
| Comparison Example | | | |
| 1 | 28 | 10 | 500* |
| 2 | 29 | 20* | >1,000 |
| 3 | 29 | 10 | 300* |
| 4 | 20* | 10 | >1,000 |
| 5 | 20* | 10 | >1,000 |
| 6 | 30 | 20* | >1,000 |
| 7 | 18 | 10 | 100 |

The results set forth in Table 2 show that the magnetic recording disks according to the invention (Examples 1 to 20) gives a satisfactorily high S/N and a satisfactorily reduced bit-shift, and shows a satisfactorily high running durability.

In contrast, the magnetic recording disk having a magnetic layer of a squareness ratio of lower than 0.15 (Comparison Example 1) gives poor running durability. Comparison Example 2 shows that a magnetic recording disk having a magnetic layer of a squareness ratio of exceeding 0.30 (Comparison Example 1) gives high running durability but an increased bit-shift. Comparison Example 3 teaches that a magnetic recording disk using a ferromagnetic metal powder which contains Al in a less amount such as less than 5 atomic % shows poor running durability. Comparison Example 4 teaches that a magnetic recording disk using a ferromagnetic metal powder which contains Al in a greater amount such as greater than 30 atomic % gives unsatisfactorily low S/N. Comparison Example 5 shows that the magnetic layer having a large surface roughness (Ra) such as a value exceeding 0.03 μm gives unsatisfactorily low S/N. Comparison Example 6 shows that the magnetic layer having a large thickness such as a thickness exceeding 0.5 μm gives not only unsatisfactorily low S/N but also increase of bit-shift. Comparison Example teaches that the magnetic recording disk comprising a thin magnetic layer directly formed on the support shows poor running durability.

What is claimed is:

1. A magnetic recording disk comprising a flexible non-magnetic support, a non-magnetic undercoating layer which is arranged on at least one surface of the support and comprises a non-magnetic inorganic powder and a lubricant dispersed in a binder, and a magnetic layer which has a thickness of 0.05 to 0.5 μm, has a center line average roughness at a cut-off value of 0.25 mm of not more than 0.03 μm, and comprises a ferromagnetic metal powder and a lubricant dispersed in a binder, wherein the ferromagnetic metal powder comprises an iron element and an aluminum element, the latter being in an amount of 5 to 30 atomic % based on the amount of iron element; and the magnetic layer is adjusted to have a squareness ratio in the direction vertical to the plane of the magnetic layer in the range of 0.15 to 0.30.

2. The magnetic recording disk of claim 1, wherein the lubricants of the magnetic layer and the non-magnetic layer comprise a fatty acid ester in their total amount of 5 to 15 weight % based on the total amount of both the magnetic and non-magnetic layers.

3. The magnetic recording disk of claim 1, wherein the magnetic layer further contains 1 to 10 weight parts of carbon black per 100 weight parts of the ferromagnetic metal powder.

4. The magnetic recording disk of claim 1, wherein the magnetic layer further contains 10 to 50 weight parts of an abrasive powder having a Mohs hardness of not less than 6 and a particle size of 0.01 to 0.5 μm, per 100 weight parts of the ferromagnetic metal powder.

5. The magnetic recording disk of claim 1, wherein the ferromagnetic metal powder further contains a cobalt element in an amount of 15 to 40 atomic % based on the amount of iron element.

6. The magnetic recording disk of claim 1, wherein the ferromagnetic metal powder further contains a rare earth element in an amount of 1.5 to 12 atomic % based on the amount of iron element.

7. The magnetic recording disk of claim 1, wherein the ferromagnetic metal powder has a BET specific surface area of 45 to 80 $m^2/g$.

8. The magnetic recording disk of claim 1, wherein the ferromagnetic metal powder has a length of 0.02 to 0.25 μm in its longitudinal direction.

9. The magnetic recording disk of claim 1, wherein the ferromagnetic metal powder has an aspect ratio of 3 to 12.

10. The magnetic recording disk of claim 1, wherein the magnetic layer is adjusted to have a squareness ratio in the direction vertical to the plane of the magnetic layer in the ratio of 0.20 to 0.28.

11. The magnetic recording disk of claim 1, wherein the non-magnetic layer has a thickness of 0.2 to 5.0 μm.

12. The magnetic recording disk of claim 1, wherein the magnetic layer has a thickness of 0.10 to 0.35 μm.

13. The magnetic recording disk of claim 1, wherein the magnetic layer has a center line average roughness at a cut-off value of 0.25 mm of 0.005 to 0.03 μm.

14. A magnetic recording and reproducing method comprising recording and reproducing a digital signal under the condition that the magnetic recording disk of claim 1 is rotated at a rotation ratio of not less than 2,000 rpm.

* * * * *